Nov. 11, 1947.    J. C. SMITH    2,430,742
TRAILER VEHICLE
Filed Sept. 20, 1944    3 Sheets-Sheet 1
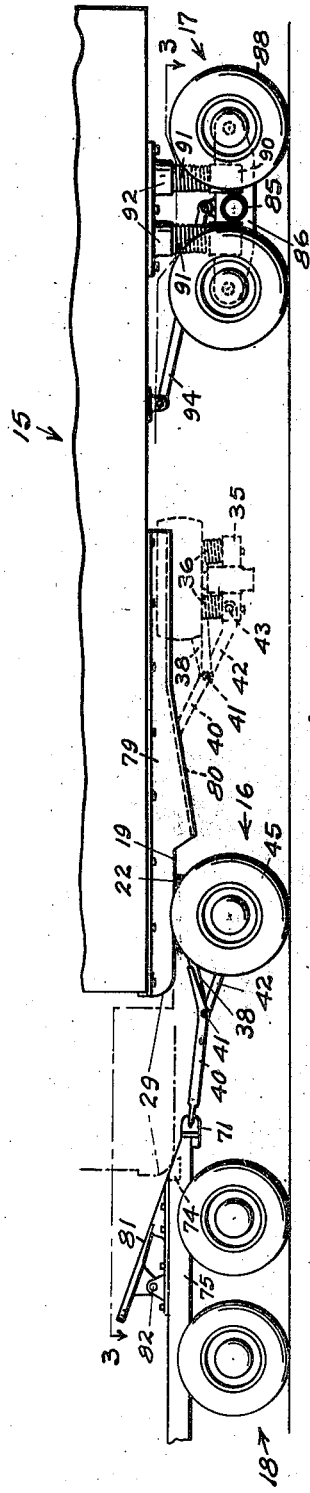
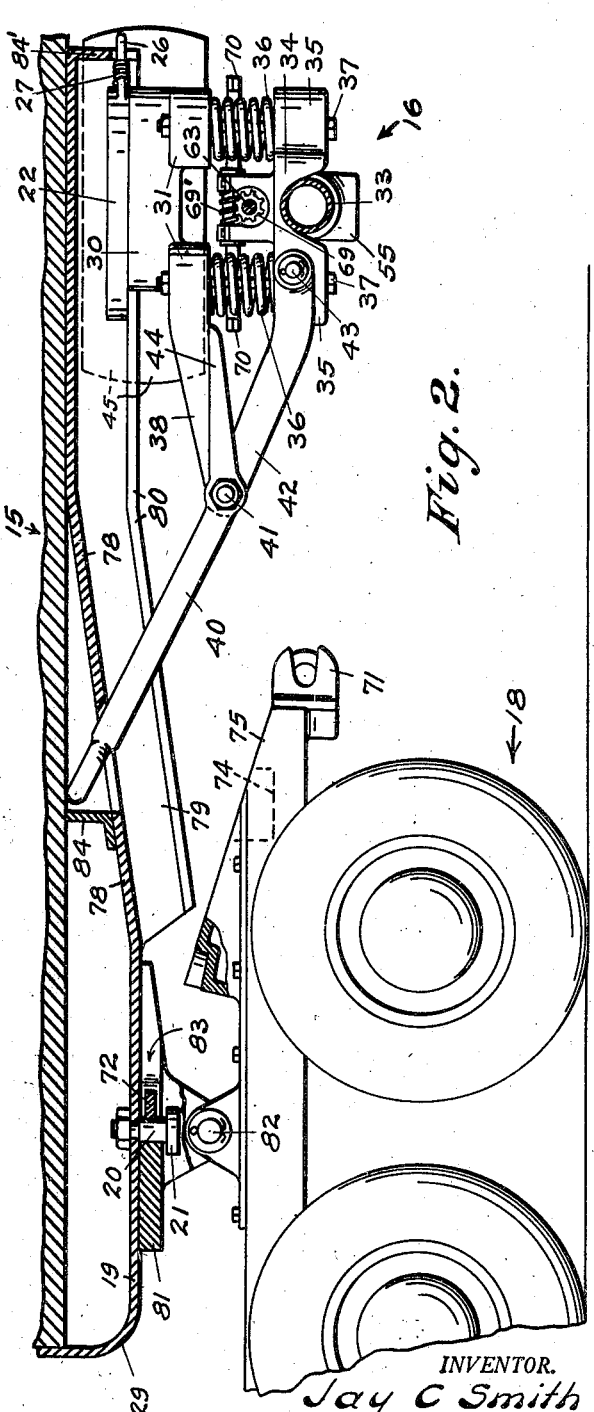
INVENTOR.
Jay C Smith
BY
Fred C. Matheny
ATTORNEY Nov. 11, 1947.  J. C. SMITH  2,430,742
TRAILER VEHICLE
Filed Sept. 20, 1944  3 Sheets-Sheet 3
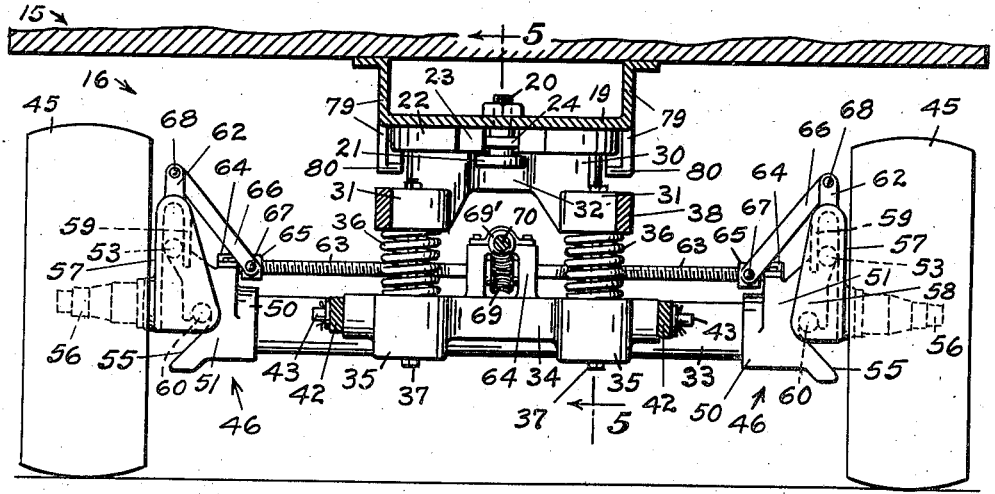
Fig. 4.
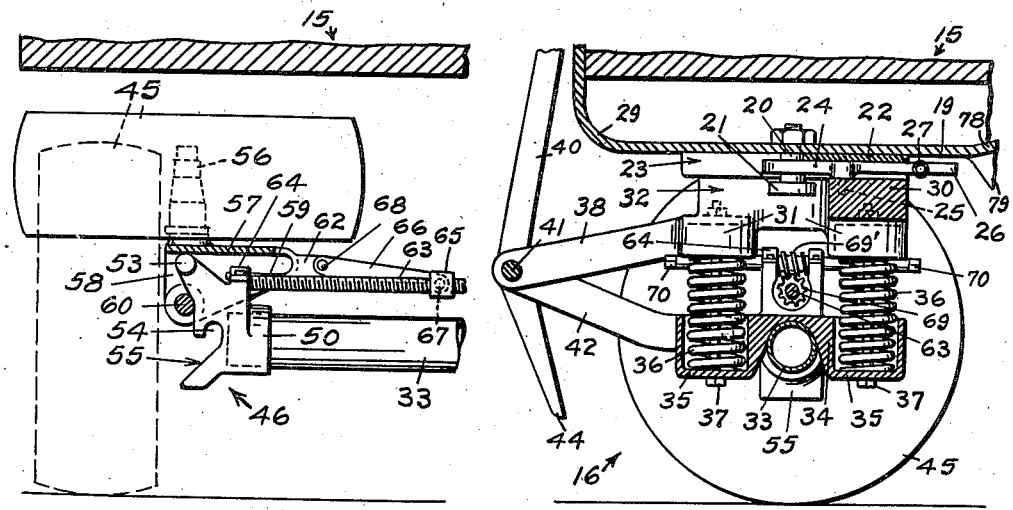
Fig. 6.  Fig. 5.
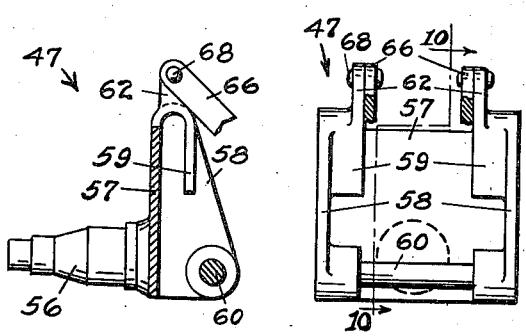
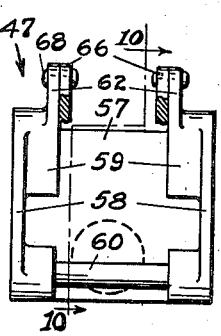
Fig. 10.  Fig. 9.
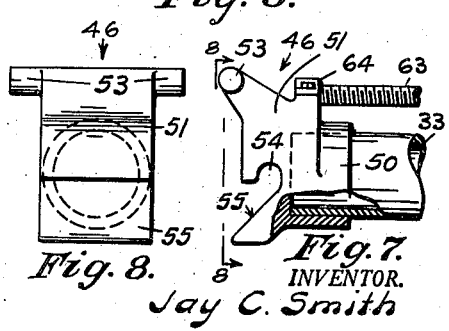
Fig. 8.  Fig. 7.
INVENTOR.
Jay C. Smith
BY
Fred C. Matheny
ATTORNEY Patented Nov. 11, 1947

2,430,742

UNITED STATES PATENT OFFICE 2,430,742

TRAILER VEHICLE

Jay C. Smith, Seattle, Wash.

Application September 20, 1944, Serial No. 555,007

10 Claims. (Cl. 280—33.1)

1

This invention relates to a trailer vehicle of the type used for transporting commodities commonly referred to as freight and an object of this invention is to provide a vehicle of this type which may be used either as a full trailer with both ends of the frame and body carried on wheels of the trailer or as a semi-trailer with one end portion of the frame and body supported on another vehicle such as a tractor.

Another object of this invention is to provide a trailer constructed so that it may be used as a road vehicle for transporting freight over the highways and also may be used as a container which can be readily loaded onto and off of a railroad car and used as a container for transporting freight over the rails.

Another object of this invention is to provide a trailer having a retractile front-end assembly adapted to cooperate with an independent vehicle in such a manner that either the front-end assembly or the independent vehicle can be used as a supporting means for the front end portion of the trailer body and the front-end portion of the trailer body can be quickly and easily transferred from one of said supporting means to the other irrespective of the load in the trailer.

Another object is to provide a trailer having a retractile front-end assembly adapted to be moved rearwardly and upwardly relative to a trailer body by the power of an independent vehicle as said independent vehicle is backed under the trailer body to thereby relieve said front-end assembly of its load and transfer said load to the independent vehicle.

Another object is to provide a retractile front-end assembly having wheels amply large in diameter and cross section to carry their full share of the load when the vehicle is used as a full trailer and to provide mounting means which will allow said front-end assembly to be retracted and to provide mechanical means for folding the front wheels into a compact unit which will be within the limits of width of a standard trailer body upper structure and which will provide ample road clearance.

Another object of this invention is to provide a retractile front-end assembly having novel and efficient coil spring suspension and draw bar means.

Another object of this invention is to provide novel and efficient trailer rear wheel mounting means that is especially well adapted to cooperate with this retractile front wheel assembly to provide an efficient three point spring suspension for the trailer body.

2

Other objects of this invention will be apparent from the following description taken in connection with the accompanying drawings.

In the drawings

Figure 1 is a side elevation of a trailer vehicle constructed in accordance with my invention showing the same supported on its own front-end assembly and connected by a draw bar with a tractor for use as a full trailer, parts of the trailer body and parts of the tractor being broken away and the front-end assembly being shown in a retracted position by broken lines.

Fig. 2 is a fragmentary view similar to Fig. 1 and on a larger scale than Fig. 1 showing the front-end assembly of the trailer vehicle in a retracted position and showing the front-end portion of the upper structure of the trailer supported on the tractor for operation as a semi-trailer.

Fig. 4 is a view partly in elevation and partly in cross section taken substantially on broken line 4—4 of Fig. 3.

Fig. 5 is a view partly in section and partly in elevation taken substantially on broken line 5—5 of Fig. 4.

Fig. 6 is a view partly in section and partly in elevation showing by full lines a front wheel in a folded position and by dot and dash lines said front wheel in an operative position.

Fig. 7 is a detached elevation, with parts broken away, showing an axle terminal or end member and a fragment of a front axle and wheel operating screw.

Fig. 8 is an end view looking in the direction 8—8 of Fig. 7.

Fig. 9 is a detached end elevation of a wheel carrying member and bearing spindle.

Fig. 10 is a view partly in section and partly in elevation of said wheel carrying member and spindle taken on broken line 10—10 of Fig. 9.

Like reference numerals designate like parts throughout the several views.

Figure 3:
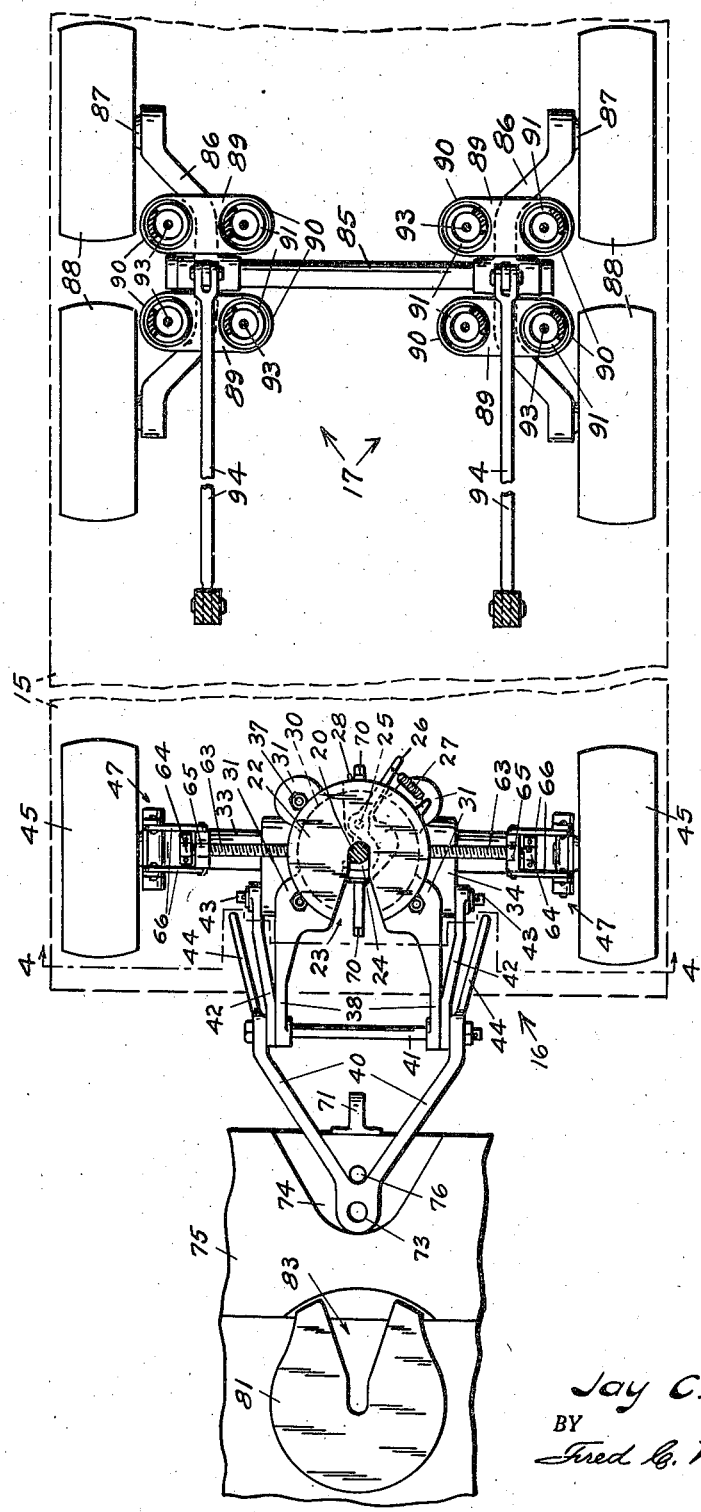
Fig. 3 is a fragmentary plan view with parts in section, taken substantially on broken line 3—3 of Fig. 1 showing a fragment of the tractor and the front-end and rear-end assemblies of the trailer vehicle and indicating by broken lines the upper structure of the trailer.

In the drawings 15 designates the upper structure of a trailer usually comprising a frame and body and which may be any desired shape and size. 16, 17 and 18 are used in a general way to designate respectively the front-end assembly of the trailer, the rear-end assembly of the trailer and an independent power actuated vehicle, herein referred to as a tractor, with which the trailer cooperates. When the front-end assembly 16 is in the position shown in Figs. 1, 3, 4 and 5 it supports the front end portion of the trailer body for movement over the highway and the trailer vehicle becomes what is commonly referred to as a full trailer. To operate the same as a semi-trailer the tractor 18 is backed under the front end portion of the trailer, the front-end assembly 16 is retracted by pushing it rearwardly of the trailer body and raising it up and folding the wheels and the front end portion of the trailer is carried on the tractor.

The term retractile front-end assembly is herein used to designate a front end assembly that can be moved away from an operative or load carrying position and have its wheels folded clear of the road.

The means on the trailer for operatively engaging the front-end assembly includes a bearing plate member 19 rigid with the upper structure 15 of the trailer and having a curved forward end portion 29. A king pin 20 is rigid with the plate member 19 and extends downwardly therefrom and has a head 21 on its lower end.

The front-end assembly is provided with a fifth wheel plate 22 which has a notch 23 extending from the central portion of said fifth wheel plate and open at the front edge thereof. The notch 23 is adapted to fit over and engage with the king pin 20. A hook shaped locking member 24 is operatively connected with the fifth wheel plate 22 for the purpose of releasably engaging the king pin 20 and locking the front-end assembly 16 to said king pin 20. The locking member 24 is fulcrumed on a pivot member 25 and has a protruding end portion 26 which may be grasped to move the locking member 24 into a disengaged position relative to the king pin 22. A spring 27 urges the locking member 24 into an engaged position relative to the king pin 22 and a catch member 28 is provided to hold said locking member in the disengaged position. The end portion 26 of the locking member may be engaged with or disengaged from the catch member 28 manually.

The fifth wheel plate 22 is fixedly secured to a spring supporting member 30 which carries a plurality of downwardly directed spring receiving cups 31. Preferably the spring supporting member 30 is of generally cylindrical shape, is of smaller diameter than the fifth wheel plate 22 so that the edges of plate 22 overhang member 30 and has a forwardly opening notch 32 therein that coincides with the notch 23 in the fifth wheel plates 22 but is wider than said notch 23 to clear the head 21 of the king pin.

A front axle 33 is positioned below the spring supporting member 30. A saddle plate 34 fits over and is secured to the axle 33. The saddle plate 34 is provided with a plurality of upwardly opening spring cups 35 that are respectively positioned in opposed relation to the spring cups 31. A coil compression spring 36 is provided in each pair of cups 31, 35. Four coil springs 36 are shown in the drawings but obviously a greater or less number of these springs may be used. Preferably a tie-bolt 37 extends through each spring 36 and the two cups 31 and 35 in which it is supported.

Two spaced apart draw bar arms 38 are rigid with the member 30 and extend forwardly therefrom. A forked draw bar 40 is connected by a pivot bolt 41 with the forward end portions of the arms 38. Two draw bar link members 42 have their forward end portions connected with bolt 41 and their rear end portions connected with pivot pins 43 on the saddle plate 34. One or more rearwardly extending arms 44 are provided on the draw bar 40 for holding said draw bar in a raised position as hereinafter explained.

The draw bar arms 38 and draw bar links 42 provide an efficient draw bar connection to both the fifth wheel plate 21 and axle 33 and at the same time allow for free action of the coil springs 36.

Two front wheels 45 are connected with opposite end portions of the front axle 32 by devices which permit said front wheels to be folded into the position shown in Figs. 2 and 6 when the front-end assembly is retracted. These devices, see Figs. 3 to 10 inclusive, each comprise an axle terminal member 46, Figs. 7 and 8, secured to each end of the front axle 33 and a wheel mounting member 47, Figs. 9 and 10, carrying a front wheel 45 and operatively connected with one of the axle terminal members 46.

Each axle terminal member 46 comprises a portion 50 rigid with the axle 33, a head portion 51 having two fulcrum pins 53 protruding transversely in opposite directions from the upper part thereof, a notch 54 in the lower part of the head 51, and a cam member 55 below said notch 54 providing an inclined approach to the notch.

Each wheel mounting member 47 comprises a spindle 56 rigid with a plate portion 57. Each plate portion 57 has spaced apart side flanges 58 which carry hook shaped members 59 that are adapted to hook over and pivotally and slidably engage with the fulcrum pins 53 on the axle terminal members 46. Said side flanges also carry a transverse bearing member 60 positioned below the hook shaped members 59 adapted to contact the cam 55 and be guided thereby into the notch 54. When the front wheels are in operative or load carrying position the load on the axle is borne by the bearing member 60. The cams 55 help to lift the wheels into proper position when said wheels are being unfolded. Each wheel mounting member 47 is further provided with two upwardly projecting perforated lugs 62.

In the drawings I have shown mechanically operated means for moving the front wheels between a vertical or operative position and a horizontal or folded position. However it is both possible and practical to omit this mechanically operated means and to move the front wheels between the vertical or operative and horizontal or folded position by direct manual effort.

The mechanically operated means for moving the front wheels between an operative and a folded position comprises a transverse screw member 63 positioned above the axle 33 parallel thereto and journaled in bearings 64. The screw 63 has right hand threads on one end portion and left hand threads on the other end portion. Nuts 65 are provided on the two oppositely threaded portions of the screw member 63 and links 66 are connected by pivot means 67 with the nuts 65 and by other pivot means 68 with the perforated lugs 62 of the wheel mounting members 47.

A worm wheel 69 on the screw member 63 meshes with a worm 69' on a shaft 70 which may be operated by any suitable means. The worm 69' and worm wheel 69 are self locking as respects screw 63.

When the front wheels are in the normal operating position as shown in Fig. 4 the bearing member 60 will be positioned in the notches 54 and the pins 53 will be in engagement with the hook members 59.

If the front-end assembly 16 is moved rearwardly of the trailer, as hereinafter described, the weight of the front end portion of the trailer body will be transferred to the tractor 18 and the front wheels 45 will be raised clear of the ground without releasing bearing members 60 from the notches 54. If the screw member 63 is then rotated so as to begin to move the two nuts 65 inwardly toward each other the wheels 45 will begin to move downwardly and as soon as the bearing members 60 contact the cams 55 said wheels will begin to tilt, the bottom portions of the same moving outwardly until the wheels hang on the fulcrum members 53. Upon further inward movement of the nuts 65 the wheels 45 will be swung about the fulcrum members 53 into a horizontal position and then will be drawn inwardly until the bearing member 60 is drawn tightly against the head 51 of the axle terminal member 46, as shown in Fig. 6. The worm 69' and worm wheel 69 operate through the screw 63 and nuts 65 to provide a self locking means to hold the wheels 45 both in a horizontal or folded position and in an upright or operative position. In unfolding the wheels, when the bearing members 60 engage with the cams 55 the links 66 will have a substantial upward incline so that outward thrust of the links 66 will exert a lift on the wheels and at the same time pressure of the bearing members 60 against the cams 55 will help to lift the wheels and properly seat the bearing members 60 in the notches 54 before the wheels take the load.

The draw bar 40 is preferably of V-shape, as shown in Fig. 3 and has a hole 73 in its outer end for engagement with a standard coupler 71 on the rear end portion of the tractor. When the trailer vehicle is functioning as a full trailer and is being towed by the tractor the draw bar 40 will be connected with coupler 71.

If the tractor is totally disconnected from trailer the draw bar 40 can be folded upwardly against the front end portion of the trailer, as shown in Fig. 5.

If the trailer vehicle is to be used as a semi-trailer with the front-end assembly retracted and the front end portion of the trailer supported on the tractor then the draw bar 40 is disconnected from the standard coupler 71 and the end thereof is positioned in a recess 74 in the rear portion of the tractor frame 75 in engagement with a pin 76, the hook shaped king pin engaging member 24 is released and brakes are set on the rear wheels of the trailer. Power is then applied to move the tractor rearwardly. As the tractor moves rearwardly it will push the front-end assembly rearwardly under the tractor body and will slide the fifth wheel member 22 rearwardly along the track plate 19 and along an upwardly inclined extension 78 of said track plate 19. Two spaced apart parallel guide members 79 are rigid with the track member 78 and upper structure of the trailer and extend downwardly therefrom and have inwardly extending flanges 80. Parts 79 and 80 form track or guide means to receive the fifth wheel member 22 as the front-end assembly is moved rearwardly. The rear end portion of the tractor frame is inclined, as shown in Figs. 1 and 2 and said tractor 18 is provided with a fifth wheel plate 81 that is pivotally mounted on transverse pivot means 82 and normally occupies an inclined position as shown. The fifth wheel plate 81, Fig. 3 has a rearwardly opening notch 83 to receive the king pin 20.

When the front-end assembly 16 is in the operative or load carrying position a full trailer is provided which is fully self supporting and may be towed in the usual manner over streets and highways.

When thus used as a full trailer this trailer can be quickly and easily loaded onto railway cars of a type used for carrying trailers and can be very quickly and easily jacked up off of its wheels and secured or made fast to such railway cars. It is to be noted that when loaded trailers are being transported on railways cars it is necessary to jack these trailers up and take the load off of the wheels in order to prevent damage to the bearings in the wheels of the trailers.

When this trailer is to be converted from a full trailer to a semi-trailer the end of the draw bar 40 is placed in the notch 74 of the tractor frame, the king pin engaging hook 24 is disengaged, the trailer is held against rearward movement, and the tractor is moved backwardly. This moves the front-end assembly rearwardly along the upper fifth wheel plate 19 and track extension 78 and at the same time moves the tractor under the front end of the trailer. As this rearward movement continues the weight of the front end portion of the trailer is transferred to the tractor and the front-end assembly 16 is lifted by the inclined track flanges 80 so that the front tractor wheels are clear of the ground. The fifth wheel plate 81 of the tractor engages the king pin 20 and is locked thereto by the usual releasable locking means 72 of the tractor fifth wheel plate 81.

After the front-end assembly is in fully retracted position the wheels are folded as shown in Figs. 2 and 6 and when folded lie closely adjacent the trailer upper structure and within the limits of the width of said upper structure. As the trailer wheels are folded they will engage with the rearwardly extending arms 44 of the draw bar 40 and automatically move said draw bar 40 into an out of the way position as shown in Fig. 2. When in this out of the way position the forward end portion of the draw bar 40 is held against sidewise movement and is closely adjacent to a stop member 84 which will prevent forward movement of the front-end assembly. Another stop member 84' may be provided to limit rearward movement of said front-end assembly.

To convert from a semi-trailer to a full trailer the front wheels 45 are unfolded thus lowering the draw bar 40 into notch 74 in engagement with the pin 76. The fifth wheel 81 of the tractor is released from the king pin 20, the trailer is secured againts forward movement, as by applying brakes to the rear trailer wheels, and the tractor is moved forwardly. This simultaneously moves the tractor out from under the front end portion of the trailer and draws the front-end assembly into its operative load carrying position in engagement with the king pin 20. The king pin 20 is thus used interchangeably by the fifth wheel plates of both the tractor and the front-end assembly.

This trailer is thus quickly and easily converted from a full trailer to a semi-trailer and vice versa with the aid of the power of the tractor. Thus this trailer can be operated on the street or highway either as a full trailer or semi-trailer and a plurality of these trailers can be used in train formation one behind another, a thing not possible with ordinary semi-trailers.

The rear-end assembly 17 of this trailer comprises a transverse axle 85 provided near its respective ends with axle beams 86 that extend longitudinally of the trailer. Each end portion of each axle beam 86 has suitable spindle means 87 on which a rear wheel 88 is mounted. Each axle beam 86 is provided near the axle 85 with saddle means 89 having upwardly directed cups 90 for receiving the lower ends of coil springs 91. The upper ends of the coil springs 91 seat within other cups 92 that are secured to the upper structure of the trailer. Tie bolts 93 connect the upper cups 92 and lower cups 90. Radius rods 94 are pivotally connected with the rear axle 85 and extend forwardly and are pivotally connected with the upper structure of the trailer. These radius rods keep the rear wheels aligned with the body and bear the drag of the rear end assembly thus relieving the springs 91 of side strain and leaving these springs free to function with maximum efficiency. The axle beams 86 are supported by and pivot about the axis of the axle 85 and operate like rockers to provide a flexible wheel mounting and compensate for unevenness in the roadbed.

The two sets of rear coil springs 91 and the one set of front coil springs 36 cooperate to provide an efficient three point spring suspension for the upper structure of the trailer.

The coil springs 91 and 36 are preferably all duplicates thus greatly simplifying construction and replacement.

The use of single axles at both front and rear of the trailer provides easy access and facilitates supporting and anchoring this trailer on a railroad car.

The foregoing description and accompanying drawings disclose a preferred embodiment of my invention but it will be understood that changes may be made within the scope of the following claims.

I claim:

1. In a convertible trailer for use with a tractor, an upper structure; a retractile front-end assembly having folding service wheels; and a draw bar connecting said front end assembly with said tractor, said draw bar serving as a thrust means by which the front-end assembly is movable by the tractor between a position in which the front-end assembly bears the front portion of the upper structure to provide a full trailer and a position in which the front-end assembly is retracted and the tractor bears the front end portion of the upper structure to provide a semi-trailer.

2. In a convertible trailer for use with a tractor, an upper trailer structure, an inclined track on said upper trailer structure; and a retractile front-end assembly having folding service wheels and movable by the tractor along said inclined track between a position in which the front-end assembly bears the front portion of the upper trailer structure to provide a full trailer and a position in which the front-end assembly is retracted and elevated to facilitate folding of the wheels and the tractor bears the front portion of the upper trailer structure to provide a semi-trailer.

3. In a trailer for use with a tractor, an upper structure; a downwardly extending king pin carried by said upper structure; a retractile front-end assembly having foldably mounted wheels; a fifth wheel plate carried by said front end assembly and having a forwardly opening notch arranged to fit over and receive said king pin, said front end assembly being movable longitudinally of the trailer between an operative load-bearing position and a retracted non-load-bearing position; and track means having an upward incline from front to rear of the trailer operable to guide said front-end assembly between the load-bearing and the non-load-bearing position.

4. In a trailer, a retractile front-end assembly having wheels foldably connected therewith; a draw bar pivotally movable between an operative position and an inoperative position; and draw bar positioning means operated by folding movement of said wheels to move said draw bar into an inoperative position.

5. In a trailer for use with a tractor having a fifth wheel plate provided with a king pin receiving notch that has an opening at the rear edge of the plate; an upper trailer structure; a retractile front-end assembly comprising a fifth wheel plate having a king pin receiving notch with an opening at the front edge of said fifth wheel plate; and a downwardly extending king pin rigid with the upper structure of said trailer for selective engagement in either of said king pin receiving notches.

6. In a trailer, a retractile front-end assembly comprising a fifth wheel plate, a transverse axle; wheels pivotally connected with the end portions of said axle and arranged to fold between the axle and the trailer; and a plurality of coil springs interposed between said fifth wheel plate and the medial portion of said axle providing a front end spring suspension with clearance for the folding of said wheels.

7. In a trailer, a retractile front-end assembly comprising a fifth wheel plate; a transverse axle; spring supporting means on said axle below said plate; coil spring means disposed between said spring supporting means and said plate; draw bar arms rigid with said plate and extending forwardly therefrom; draw bar links pivotally connected between said spring supporting means and the forward end portions of said arms; and a draw bar pivotally connected with the forward end portions of said arms and said links.

8. In a trailer having a retractile front-end assembly provided with foldable wheels; an axle; a wheel carrying member fulcrumed on an end portion of said axle for pivotal and sliding movement; link means pivotally connected with said wheel carrying member above the fulcrum thereof; devices for moving said link means; a notch in the end portion of said axle below the fulcrum of said wheel carrying member; an inclined cam on said axle below said notch; and bearing means on said wheel carrying member positioned to engage said inclined cam means and to be guided upwardly thereby into said notch as said wheel carrying member is swingingly moved toward a vertical position by thrust of said link means.

9. In a trailer having a retractile front-end assembly provided with foldingly mounted wheels, an axle; fulcrum means on an end portion of said axle; a notch in the end portion of said axle below said fulcrum means; a wheel carrying member; means forming fulcrum engaging channels in said wheel carrying member pivotally and slidably engaging said fulcrum means; link means having the upper end portion thereof pivotally connected with said wheel carrying member above said slot forming means; screw means connected with said link means operable to move the inner end portion of said link means parallel to said axle to thereby swingingly and slidably move said wheel carrying member on said fulcrum means; bearing means on said wheel carrying member arranged to occupy said slot when said wheel carrying member is in an upright position; and a cam rigid with the end portion of said axle below said notch providing an inclined approach to said notch cooperating to move said wheel carrying member upwardly when said bearing means is pressed against said cam.

10. In a trailer, a retractile front-end assembly comprising a fifth wheel plate; a transverse front axle; coil spring means positioned substantially medially of said front axle resiliently supporting said fifth wheel plate above said front axle; a rear axle; coil spring means positioned adjacent each end of said rear axle resiliently supporting the upper structure of the trailer above said rear axle and cooperating with said front spring means to provide a three point spring suspension for the upper structure of the trailer; an axle beam connected with each end portion of said rear axle and extending transversely thereof; and a rear wheel mounted on each end portion of each axle beam.

JAY C. SMITH.

REFERENCES CITED

The following references are of record in the file of this patent:

UNITED STATES PATENTS

| Number | Name | Date |
| --- | --- | --- |
| 1,850,531 | Cadman | Mar. 22, 1932 |
| 1,887,118 | Collinge | Nov. 8, 1932 |
| 1,898,854 | Reid | Feb. 21, 1933 |
| 2,333,910 | Winters | Nov. 9, 1943 |
| 1,159,746 | Clark | Nov. 9, 1915 |
| 2,032,657 | Frederickson | Mar. 3, 1936 |
| 1,095,137 | Bailey | Apr. 28, 1914 |